United States Patent

[11] 3,597,670

| | | |
|---|---|---|
| [72] | Inventor | Walter Kohlhagen<br>Elgin, Ill. |
| [21] | Appl. No. | 56,102 |
| [22] | Filed | July 1, 1970 |
| [45] | Patented | Aug. 3, 1971 |
| [73] | Assignee | The Bunker-Ramo Corporation<br>Broadview, Ill.<br>Continuation of application Ser. No.<br>681,171, Nov. 7, 1967, now abandoned. |

[54] DIRECT-CURRENT OPERATED SYNCHRONOUS MOTOR
10 Claims, 10 Drawing Figs.

[52] U.S. Cl. .................................................... 318/138,
318/254
[51] Int. Cl. ....................................................... H02k 29/00
[50] Field of Search ............................................ 318/138,
254

[56] References Cited
UNITED STATES PATENTS

| 2,986,684 | 5/1961 | Cluwen | 318/138 |
|---|---|---|---|
| 2,986,686 | 5/1961 | Clifford | 318/254 |
| 3,134,220 | 5/1964 | Meisner | 318/138 X |
| 3,209,224 | 9/1965 | Guinard | 318/138 |
| 3,229,178 | 1/1966 | Favre | 318/138 |
| 3,242,404 | 3/1966 | Favre | 318/138 |

*Primary Examiner* — Gene Z. Rubinson
*Attorney* — Frederick M. Arbuckle

ABSTRACT: The disclosure deals with an electromechanical device having a rotor with associated pickup and drive coils, with the signals induced on rotor rotation in the pickup coil being by an amplifier supplied at amplification to the drive coil. The device features frequency control by a high frequency source such as an oscillator of inherent high rate stability, with the high frequency being injected into the electric circuit of the device so that this circuit will operate at a frequency which is an invariable submultiple of the high frequency.

PATENTED AUG 3 1971
3,597,670
SHEET 1 OF 2
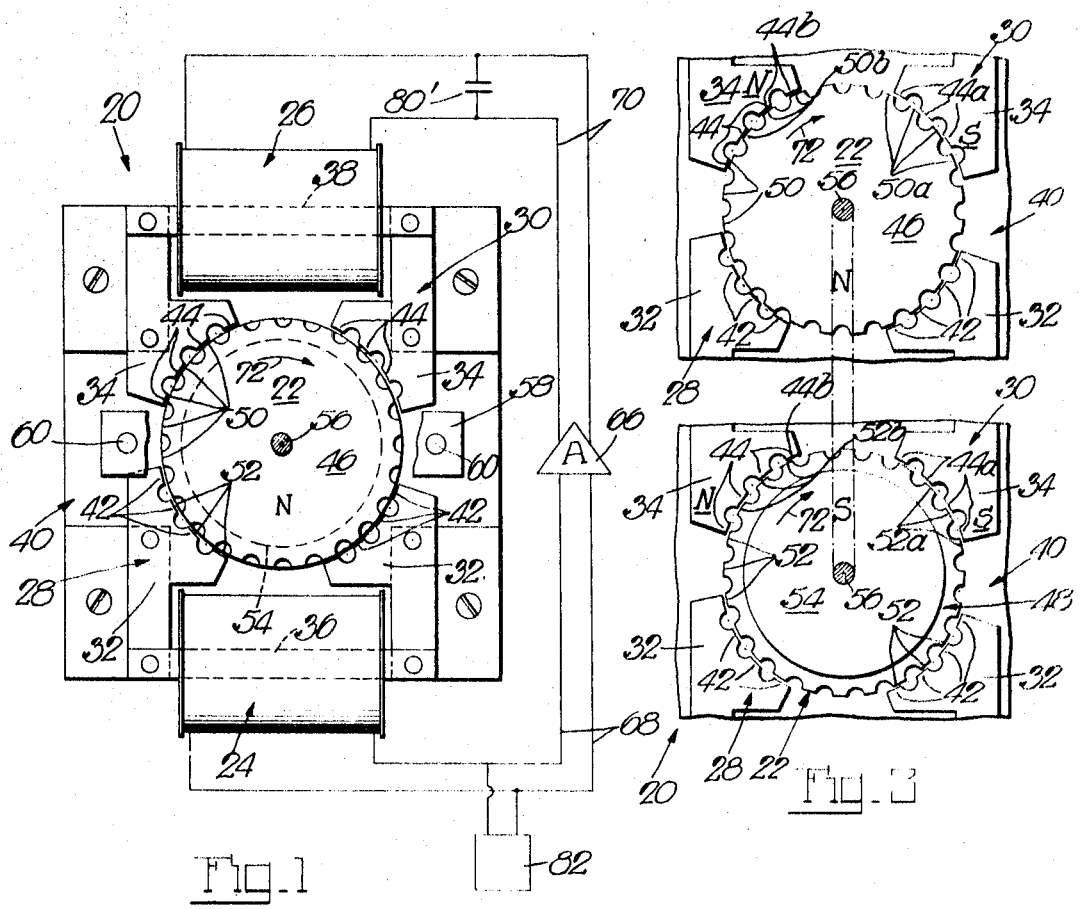
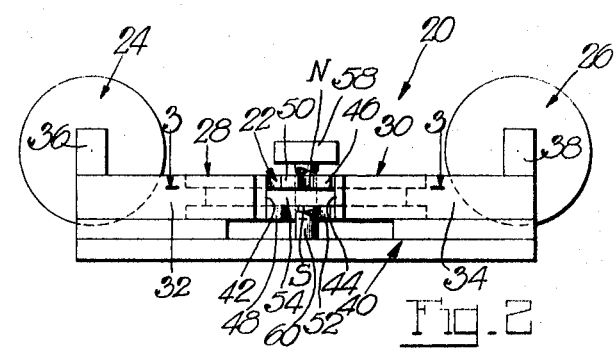
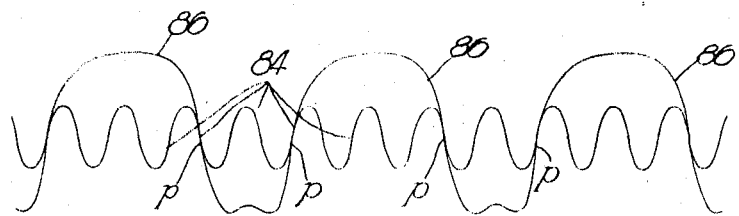
INVENTOR
Walter Kohlhagen
BY
Attorney.

INVENTOR
Walter Kohlhagen
BY
Attorney

DIRECT-CURRENT OPERATED SYNCHRONOUS MOTOR

This application is a continuation of Ser. No. 681,171, now abandoned.

This invention relates in general to rotary systems operated by electric energy, and in particular to an electromechanical device including a rotor and generating a frequency for operating the rotor in synchronism therewith.

In prior electromechanical devices of this type the motor speed is controlled directly as, for example, by an associated vibrator or oscillator, or the motor is operated synchronously by means of a controlled oscillator, or by means of a high frequency oscillator with multivibrators or other frequency division circuits of considerable cost and complication. Where the motor is controlled by an associated vibrator or oscillator, the stability or accuracy leaves much to be desired because of instability of the low frequency oscillator, and further because of interaction between the motor and control element. Where the motor is driven directly by an L-C oscillator, either the oscillator must operate at low frequencies where large inductances and capacitors are required which are costly and relatively unstable due to vibration, temperature changes and the like. If a higher frequency is used, the motor speed will be undesirably high requiring added gear reduction and entailing increased wear and noise. The solution of using vacuum tubes or transistors as frequency dividers produces excellent results but also added cost and complication, as well as wasted power loss where that is a factor.

It is the primary aim and object of the present invention to provide an electromechanical device of this type the operating frequency of which is within the aforementioned range of lower frequencies, yet is as stable under rate-disturbing influences as would a source of much higher frequency.

It is another object of the present invention to provide an electromechanical device of this type with a frequency control in the form of a frequency divider which holds the operating frequency of the device to an invariable submultiple of an applied high frequency.

It is a further object of the present invention to provide an electromechanical device of this type as a synchronous motor which is synchronized to a high frequency, but operates at a lower frequency at which the motor will generate the least noise, be subject to minimum wear and, hence, have a long useful life, be of small size, and require a minimum of speed reduction for many practical applications, such as a clock drive, for example.

Another object of the present invention is to provide a synchronous motor of this type which has a single-transistor circuit that operates as an amplifier and also as a frequency divider to obtain a lower operating frequency from a high frequency to which the motor is synchronized.

A further object of the present invention is to provide a synchronous motor of this type with a single transistor in its circuit which acts to amplify a low-energy frequency source for operating the motor, and to use the single transistor and motor to act also as the aforementioned frequency divider.

It is another object of the present invention to provide a synchronous motor of this type which has a very simple circuit, operates as a frequency divider, provides rotary output and delivers this output in synchronism with a higher frequency than that at which the motor operates.

It is a further object of the present invention to obtain in a synchronous motor of this type the aforementioned frequency division, synchronization and rotary output at very high efficiency at which the rotary output is high for its utilization.

Another object of the present invention is to provide a synchronous motor of this type the circuit of which is insensitive to changes in parameters, so that variations in resistances, capacities, voltages, etc., do not adversely affect the aforementioned functions of the circuit.

A further object of the present invention is to provide a synchronous motor of this type the rotary output of which is unidirectional and will even reverse on a start in the opposite, wrong, direction.

It is another object of the present invention to provide a synchronous motor of this type which effects self-starting, by arranging the circuit thereof to have low-energy oscillation or pulsation which urges the rotor, when idle, into starting vibration for its takeoff, but does not interfere with the normal rotor drive at the operating frequency of the circuit.

Further objects and advantages will appear to those skilled in the art from the following, considered in conjunction with the accompanying drawings.

In the accompanying drawings, in which certain modes of carrying out the present invention are shown for illustrative purposes;

FIG. 1 is a plan view of an electromechanical device embodying the present invention;

FIG. 2 is a side view of the electromechanical device;

FIG. 3 is an exploded view of part of the device for better demonstration of its electromechanical function;

FIG. 4 is a graph showing electric signals of related frequencies in the operating circuit of the device;

Figure 5:
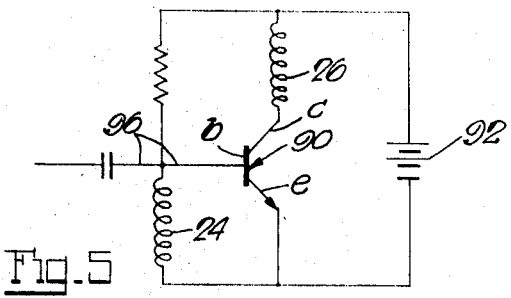
FIGS. 5, 6 and 7 are schematic circuit diagrams of the same device embodying the invention in different ways.

Referring to the drawings, and more particularly to FIGS. 1 to 3 thereof, the reference numeral 20 designates an electromechanical device having a rotor 22 and therewith associated pickup and drive coils 24 and 26 with fields 28 and 30. The fields 28 and 30 are formed in this instance by spaced ferromagnetic plates 32 and 34 and connecting yokes 36 and 38 which serve as iron cores for the respective pickup and drive coils 24 and 26, with these plates 32 and 34 being suitably mounted on a nonmagnetic base 40 and providing field poles 42 and 44, respectively.

The rotor 22 comprises in this instance two ferromagnetic discs 46 and 48 with shaped poles 50 and 52, and an axially magnetized disc 54 intermediate the discs 46 and 48, with these discs mounted as a unit on a rotor shaft 56 which is journaled in suitable bearings in the base 40 and in a strap 58 which by pillars 60 is mounted on the base in spaced relation therewith. With the magnetized disc 54 having the exemplary permanent N and S face polarities indicated in the drawings, the flanking rotor discs 46 and 48 and their respective poles 50 and 52 have corresponding N and S polarities as also indicated in the drawings. The field poles 42 and 44 cooperate with the poles of both rotor discs 46 and 48 and to this end are coextensive with the rotor unit over its axial extent (FIG. 2).

The device 20 further comprises an amplifier 66 and electrical connections 68 and 70 between the pickup coil 24 and the input of the amplifier and between the output of the latter and the drive coil 26, respectively. The amplifier 66 may be of any suitable kind powered from a DC source such as a battery.

In operation of the device, i.e., with the rotor 22 running in exemplary clockwise direction as indicated by the arrows 72 in FIGS. 1 and 3, the electric signals induced in the pickup coil 24 through cooperation between the poles of the running rotor 22 and the field poles 42 are transmitted to the input of the amplifier 66 and the amplified output thereof is transmitted to the drive coil 26 to generate in the associated field 30 drive pulses for the rotor 22 in well known manner. For operation of the device, energy is fed from the drive system to the pickup system via the rotor 22, with the latter serving as the feedback element to convert electrical energy provided by the drive coil to the pickup coil 24 so as to provide an interaction between them which is a function of the angular speed of the rotor. The electric signals picked up by coil 24 are supplied to the input of amplifier 66. The frequency of these signals and, hence, of the drive pulses for the rotor depends on the rotary speed of the rotor, and this frequency and, hence, rotor speed are for most applications required to be constant.

Figure 6:
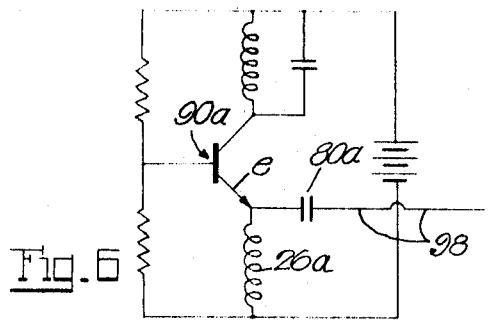

The circuit shown in FIG. 5, while operative to provide motor speeds and frequencies at submultiples of the higher control frequency, will be improved by placing a suitable capacitor 80' (FIG. 1) or 80a (FIG. 6) across one of the inductive elements, preferably the drive coil as shown in FIGS. 1 and 6. This capacitor broadly tunes the circuit to the operating frequency of the motor so that the response of the motor-coil-capacitor combination is tuned to the motor frequency. With this arrangement, the motor, without the controlled frequency, will operate in the generally desired range, and with the controlled frequency applied will widen the parameters to effect a particular frequency division. For example, if the control frequency is 250 cycles per second and the motor frequency is 50 cycles per second, the motor circuit should be tuned by the capacitor to substantially 50 cycles per second, and the motor will then, with the arrangement shown, effect the frequency division and run under the control of the high frequency but at a low frequency which in this example is one-fifth of the control frequency. This arrangement will operate successfully over considerable variation in the parameters concerned, such as variation in voltages, resistances, temperatures, and the like, and the motor will, if subjected to severe shock or deliberately forced into over or under speed, quickly return to the proper running speed.

In accordance with an important aspect of the present invention, the electromechanical device 20 of FIGS. 1 to 3 acts as a frequency divider by which an applied high frequency of great stability from a suitable source keeps the operating frequency of the device captive at an exact division of the high frequency, i.e., at an invariable submultiple of the latter. To this end, there is provided an electric high frequency source 82 which has high stability, with the output of this source being supplied to the amplifier 66, preferably in the input circuit thereof (FIG. 1) for amplification in the amplifier of the high frequency signals together with the induced signals from the pickup coil 24. The high frequency source 82 may be like or similar to the mechanical oscillator shown in my copending application Ser. No. 450,149, filed Apr. 22, 1965, or may be of electronic or any other known type suitable for the purpose.

With the high frequency source supplying electric signals at the constant frequency represented by the wave lines 84 in FIG. 4, the operating current generated in the device by the rotor 22 and represented by the wave lines 86 in FIG. 4 will be forced into maximum cooperative relation with the high frequency signals 84 at which they lock in phase with the closest recurring ones that they encounter, this being in the present example over the common phases $p$ of the respective signals 84 and 86 (FIG. 4), with the frequency division of the operating signals 86 being in this example at an invariable one-fourth of the high frequency signals 84. The urgency of the operating signals 86 to lock into phase with the regular recurring high frequency signals 84 which they encounter is quite high and easily compels the rotor 22 to yield in its operation to the dictates of the phase locked signals 84 and 86, wherefore it is the rotor 22 which then serves as the frequency divider. Further, interlock of the signals 84 and 86 at their regularly recurring common phases $p$ is so firm that the operating signals 86 will remain in exact phase lock with the high frequency signals 84 under most rate-disturbing conditions, and will be returned into the same exact phase lock relation therewith on abatement of exceptionally severe disturbing conditions under which the operating frequency 86 may on rare occasions be temporarily offbeat and the high frequency 84 remain unaffected or temporarily even somewhat affected. Thus, with the high frequency source having high stability which is virtually immune to even severe rate-disturbing influences, and with the operating signals being firmly locked in phase with the high frequency signals, the rotor will in its operation be synchronized to the high frequency, yet will operate at a frequency which is an invariable submultiple of the high frequency. With this arrangement, the device lends itself with minimum speed reduction beyond the rotor for many practical applications, such as a signal source of relatively low frequency and especially as a synchronous drive motor for clocks and the like where the rotary output of the device is put to ultimate use and the motor must, and by its relatively low rotor speed is largely conducive to, meet the requirements of minimum reduction gearing, least noise generation and wear of its moving parts, as well as small size and low cost. Further, by locking the operation as well as operating frequency of the motor to the high frequency control, the motor is in its performance particularly reliable and rather insensitive to changes in parameters such as variations in voltages, resistances, capacities, etc., and may also perform at high efficiency in its rotary output for drive purposes.

In accordance with another aspect of the present invention, the device 20 is arranged for unidirectional drive of the rotor 22, whereby on coordination of the field poles of the pickup and drive coils with each other and with the rotor poles for optimum conditions of frequency division for the selected direction of rotor rotation, the rotor will run in the selected direction and will reverse if started in the opposite direction. These poles are to this end coordinated so that at the instant of each change in polarity of the field poles 44 of the drive coil 26 the rotor poles nearest thereto are spaced at different distances therefrom at which their overall attraction to and repellance from these nearest field poles in one direction of rotor rotation by far overpowers their overall attraction to and repellance from the same field poles in the opposite direction of rotor rotation and thus compels the rotor to run in this one direction which is the desired direction, and to reverse if started in the opposite direction. An example of such polar arrangement is illustrated in FIG. 3. Thus, the field poles 42 of the pickup coil 24 and cooperating rotor poles 50, 52 are shown at the instant at which an induced signal in the pickup coil changed phase and the amplified signal in the drive coil 26 just changed the polarities of the field poles 44 thereof to the ones indicated in FIG. 3. With this instantaneous setup, the field poles 44 cooperate with the nearest rotor poles 50, 52 in compelling the rotor 22 to turn with overwhelming force in the desired direction which in this instance is clockwise as indicated by the arrows 72. More particularly, the rotor poles 50a of N polarity are then predominantly attracted in clockwise direction to the field poles 44a of then S polarity while other rotor poles 50b of the same N polarity are simultaneously repelled in clockwise direction from the field poles 44b of then N polarity, and the rotor poles 52a of S polarity are then predominantly repelled in clockwise direction from the field poles 44a of then S polarity while other rotor poles 52b are simultaneously attracted predominantly in clockwise direction to the field poles 44b of then N polarity. These magnetic forces which then urge the rotor 22 in the desired clockwise direction so overwhelm any magnetic forces between the rotor poles and respective field poles tending to turn the rotor in the opposite direction that rotation of the rotor in the desired clockwise direction is inevitable and reversal of the rotor into clockwise direction on a start in anticlockwise direction is equally inevitable.

While in the exemplary electromechanical device 20 of FIGS. 1 to 3 the rotor 22 provides the rotor discs 46 and 48 of the respective permanent polarities N and S as determined by the axially magnetized intermediate disc 54, it is, of course, fully within the purview of the present invention to provide in lieu of this particular rotor a single rotor disc with successive poles of permanent opposite polarities, and to arrange the field poles of the pickup and drive coils with the rotor poles in correct and obvious manner. Also, as a space saving measure, two rotors on a common staff may be coupled to the two fields to permit both coils and fields to be placed on the same side of center rather than on opposite sides thereof as in FIG. 1.

Figure 7:
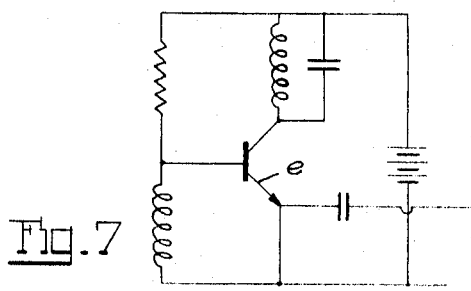

The amplifier 66 in the electromechanical device 20 may be, and preferably is, a transistor amplifier such as the transistor 90 in FIG. 5 which also shows the electric circuitry. Thus, the pickup coil 24 is connected in the input circuit of the transistor amplifier 90 and the drive coil 26 is connected in the output circuit of this transistor, with the pickup coil being connected between the base electrode $b$ and the emitter electrode e of the transistor, the drive coil 26 being connected between the collector electrode c of the transistor and the negative terminal of a low voltage DC source 92, and the emitter electrode e being connected to the positive terminal of the DC source. As previously mentioned, the rotor-synchronizing high frequency is preferably applied to the input circuit of the amplifier, and this high frequency is to this end applied at 96 to the base circuit of the transistor amplifier. In the modified arrangement of FIG. 6, the high frequency is at 98 applied to the circuit of the emitter e of the transistor amplifier 90a, and the drive coil 26a is in this instance connected in the emitter circuit. FIG. 7 shows another arrangement where the control frequency is applied to the emitter and across a resistor.

Figure 8:
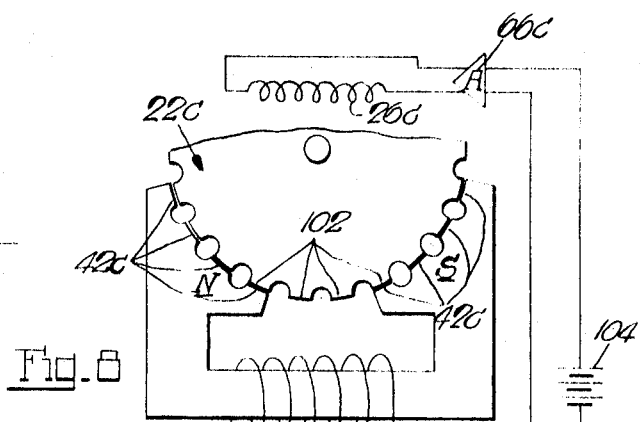
FIGS. 8 and 9 are schematic circuit diagrams of an electromechanical device embodying the present invention in different modified ways.

While in the described electromechanical device 20 of FIGS. 1 to 3 the rotor 22 has poles of permanent polarities, it is also within the ambit of the present invention to use a nonmagnetized rotor, such as the rotor 22c in the arrangement of FIG. 8, for example. Thus, the rotor 22c may be a single ferromagnetic disc having the shaped poles 102 with which cooperate the field poles 42c of the pickup coil 24c and also the field poles (not shown) of the drive coil 26c. The pickup coil 24c is constantly supplied with DC from a low voltage source 104 in the input circuit of the amplifier 66c whereby the field poles 42c are polarized at the indicated signs whenever DC is supplied to the pickup coil. Accordingly, when the rotor 22c turns the reluctance between the field poles 42c and cooperating rotor poles 102 fluctuates in synchronism with the rotor rotation, resulting in modification of the applied DC in the pickup coil 24c into pulsating DC which on amplification in the amplifier 66c is supplied to the drive coil 26c for the drive of the rotor 22c at the frequency of the pulsating DC and in synchronism with the high frequency from the source 82c which in this instance is applied at 106 to the input circuit of the amplifier 66c.

Figure 9:
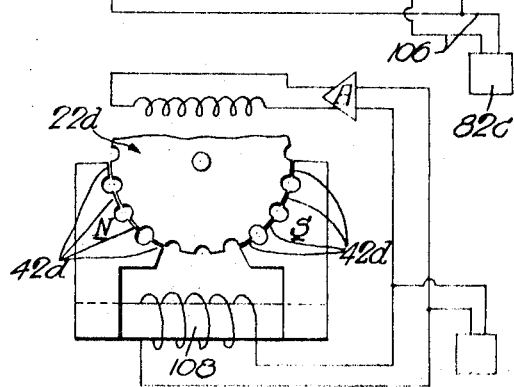

FIG. 9 shows another form of the device which also uses a nonpolarized rotor 22d, and the field poles 42d are permanently polarized at the exemplary indicated signs by being connected with a permanent magnet 108, whereby on rotation of the rotor 22d pulsating DC is induced in the pickup coil 24d. The operation of this device is otherwise the same as that of the device shown in FIG. 8.

Figure 10:
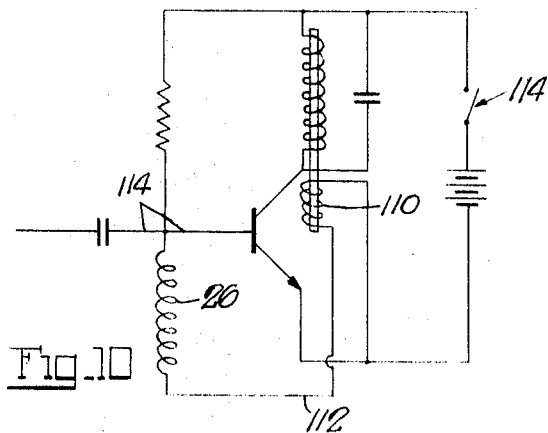
FIG. 10 is a circuit diagram of an electromechanical device showing an additional feature of the present invention.

In accordance with another aspect of the present invention, provisions are made whereby the rotor of an electromechanical device of this type will self-start on closing the operating circuit of the device. This is achieved by positive or direct feedback of energy from the drive coil to the pickup coil, whereby the circuit oscillates and thereby excites the rotor into a self-start. Thus, in the exemplary device of FIGS. 1 and 2 a secondary coil 110 is inductively coupled with the drive coil 26 in the manner shown in FIG. 10, with one end of this secondary coil 110 being connected with the negative terminal of the DC source which powers the amplifier, and the other end of this secondary coil being through 112 connected with the pickup coil 24. Thus, on closing the operating circuit at the switch 114, the entire circuit will oscillate or pulsate and thereby excite the rotor into a self-start. The high frequency is in this instance applied at 114 to the base circuit of the transistor-type amplifier in FIG. 10. However, this rotor self-starting feature will prevail even if no high frequency were injected into the operating circuit.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In an electromechanical device, the combination of a ferromagnetic rotor having nonpolarized poles, a magnetic circuit including a pickup coil with a first set of poles and a set of adjacent cooperating rotor poles, a DC source connected with said pickup coil so that each poles of said first set is of fixed polarity and the voltage in said pickup coil pulsates in step with the rotor rotation, another magnetic circuit including a drive coil with a second set of poles other than said first set and another set of adjacent cooperating rotor poles, an amplifier, means electrically connecting said pickup coil with said amplifier to supply an input signal thereto as the rotor rotates, means to supply said drive coil from the output of said amplifier to supply driving impulses to said rotor, with said driven rotor acting to feed energy from said drive coil and its poles back to said pickup coil and its poles, and means supplying to said amplifier electric signals of a controlled frequency to provide input signals at an invariable submultiple of said controlled frequency.

2. In an electromechanical device, the combination of a ferromagnetic rotor having nonpolarized poles, a magnetic circuit including a pickup coil with a first set of poles and a set of adjacent cooperating rotor poles, of which each poles of said first set is of fixed polarity so that a voltage is generated in said pickup coil which pulsates in step with the rotor rotation, another magnetic circuit including a drive coil with a second set of poles other than said first set and another set of adjacent cooperating rotor poles, an amplifier, means electrically connecting said pickup coil with said amplifier to supply an input signal thereto as the rotor rotates, means to supply said drive coil from the output of said amplifier to supply driving impulses to said rotor, with said driven rotor acting to feed energy from said drive coil and its poles back to said pickup coil and its poles, and means supplying to said amplifier electric signals of a controlled frequency to provide input signals at an invariable submultiple of said controlled frequency.

3. In an electromechanical device, the combination of a rotor having poles, a magnetic circuit including a pickup coil with a first set of poles and a set of adjacent cooperating rotor poles of which each pole of one set is of fixed polarity, another magnetic circuit including a drive coil with a second set of poles other than said first set and another set of adjacent cooperating rotor poles, an amplifier, means electrically connecting said pickup coil with said amplifier to supply an input signal thereto as the rotor rotates, means to supply said drive coil from the output of said amplifier to supply driving impulses to said rotor, with said driven rotor acting to feed energy from said drive coil and its poles back to said pickup coil and its poles, means supplying to said amplifier electric signals of a controlled frequency to provide input signals at an invariable submultiple of said controlled frequency, and means for feeding part of the electric energy supplied to said drive coil back to said pickup coil to produce pulsating electric signals in said coils for exciting said rotor, when idle, into a self-start, with said electric-energy feedback means comprising a secondary coil in inductive relation with said drive coil and electrically connected with said pickup coil.

4. In an electromechanical device, the combination of a rotor having poles, a magnetic circuit including a pickup coil with a first set of poles and a set of adjacent cooperating rotor poles of which each pole of one set is of fixed polarity, another magnetic circuit including a drive coil with a second set of poles other than said first set and another set of adjacent cooperating rotor poles, a transistor amplifier with electric base, emitter and collector circuits and a powering DC source, said drive coil is in said collector circuit and said pickup coil is in one of said electric circuits other than said collector circuit, means injecting electric signals of controlled frequency into one of said electric circuits to provide said amplifier with an input signal at an invariable submultiple of said controlled frequency as the rotor rotates, and a secondary coil in inductive relation with said drive coil and electrically connected with said pickup coil for feeding electrical energy from said secondary coil directly to said pickup coil to produce in said drive and pickup coils pulsating electric signals for exciting said rotor, when idle, into a self-start.

5. In an electromechanical device, the combination of a rotor having poles of two sets of permanent opposite polarities, a magnetic circuit including a pickup coil with a first set of field poles cooperating with the nearest rotor poles of both sets, another magnetic circuit including a drive coil with a second set of field poles other than said first set and cooperating with the nearest rotor poles of both sets, a transistor amplifier with electric base, emitter and collector circuits and a powering DC source, said drive coil is in said collector circuit and said pickup coil is in one of said electric circuits other than said collector circuit, and means for feeding part of the electrical energy supplied to said drive coil back to said pickup coil to produce pulsating electrical signals in said coils for exciting said rotor, when idle, into a self-start, with said electrical energy feeding means being a secondary coil in inductive relation with said drive coil and electrically connected with said pickup coil.

6. In an electromechanical device, the combination with a rotor having magnetic poles, a magnetic circuit including a pickup coil with a first set of field poles and a set of adjacent cooperating rotor poles of which each pole of one set is of fixed polarity, another magnetic circuit including a drive coil with a second set of field poles other than said first set and another set of adjacent cooperating rotor poles, with the field poles of said sets being angularly coordinated so that the field poles of either set are in alignment with the nearest rotor poles when the field poles of the other set are out of alignment with the nearest rotor poles, an amplifier having output circuitry and controlling circuitry, a power source applying to said amplifier circuitry uninterrupted DC means electrically connecting said pickup coil with said controlling circuitry to supply an input signal thereto as the rotor rotates, means to supply said drive coil from said output circuitry of said amplifier to supply driving impulses to said rotor, and a controlling frequency electrically connected to said controlling circuitry of said amplifier to effect amplification of said controlling frequency in said amplifier and cause operation of said rotor at an invariable submultiple of said controlling frequency.

7. In combination with an electromechanical device, having: a rotor having magnetic poles, a magnetic circuit including a pickup coil with a first set of poles and a set of adjacent cooperating rotor poles of which each pole of one set is of fixed polarity, another magnetic circuit including a drive coil with a second set of poles other than said first set and another set of adjacent cooperating rotor poles; an amplifier having input and output circuitry, a power source applying uninterrupted DC to said amplifier, means electrically connecting said pickup coil with said input circuitry to supply an input signal to the amplifier as the rotor rotates, means to supply said drive coil from said output circuitry of said amplifier to supply driving impulses to said rotor, a free running timing oscillator having frequency determining circuitry separate from said device, as well as from said input and output circuitry, said oscillator deriving a continuous wave output of predetermined frequency independent of parameters of the electromagnetic device and said amplifier circuitry, means for applying the oscillator output frequency to the input circuitry of the amplifier, and means connected in circuit with one of the coils for tuning said one coil to a subharmonic of said oscillator output frequency so that the drive coil excites said rotor in response to the subharmonic.

8. The combination of claim 7, further including means other than said rotor for feeding part of the electric energy supplied to said drive coil back to said pickup coil to produce pulsating electric signals in said coils for exciting said rotor, when idle, into a self-start.

9. In combination with an electromechanical device having: a rotor having magnetic poles, a magnetic circuit including a pickup coil with a first set of poles and a set of adjacent cooperating rotor poles of which each pole of one set is of fixed polarity, another magnetic circuit including a drive coil with a second set of poles other than said first set and another set of adjacent cooperating rotor poles, said pickup coil deriving an output wave having a frequency dependent upon the angular velocity of the rotor while the rotor is turning; a free running oscillator, said oscillator having frequency determining circuitry independent of the frequency derived from the pickup coil for deriving an output wave having a frequency determined by said frequency determining circuitry; means for applying to the drive coil replicas of combined waves derived from the pickup coil and the oscillator; and means connected in circuit with one of the coils for tuning said one coil to a subharmonic of the frequency of the oscillator output wave so that the drive coil excites said rotor in response to the subharmonic.

10. The combination of claim 9 wherein the tuning means comprises a capacitor connected in shunt with said one coil.